Figure 1:
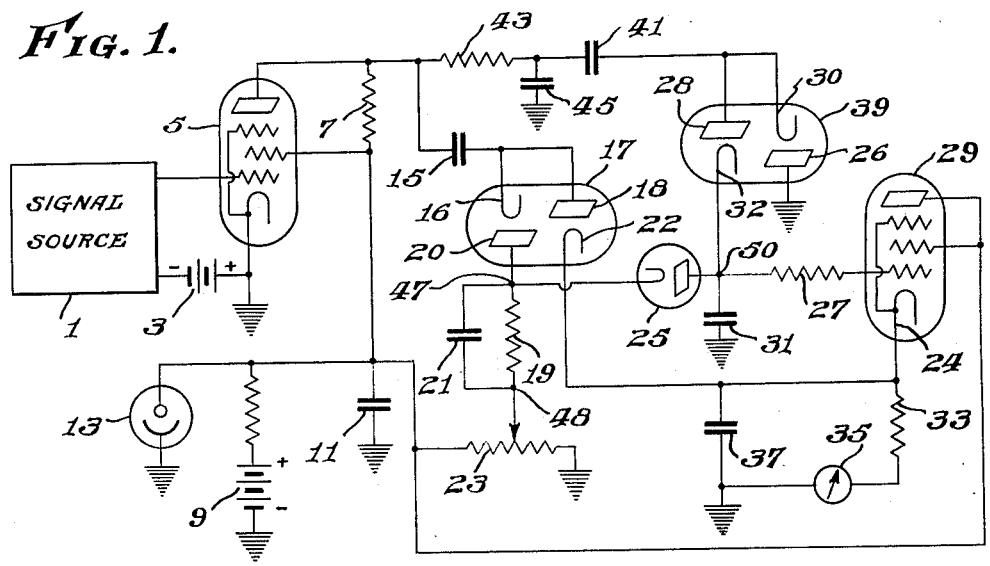

July 9, 1946.   R. C. SANDERS, JR   2,403,557
FREQUENCY DETERMINING DEVICE
Filed Feb. 27, 1941   3 Sheets-Sheet 1

Inventor
Royden C. Sanders, Jr.
By J. J. Huff
Attorney

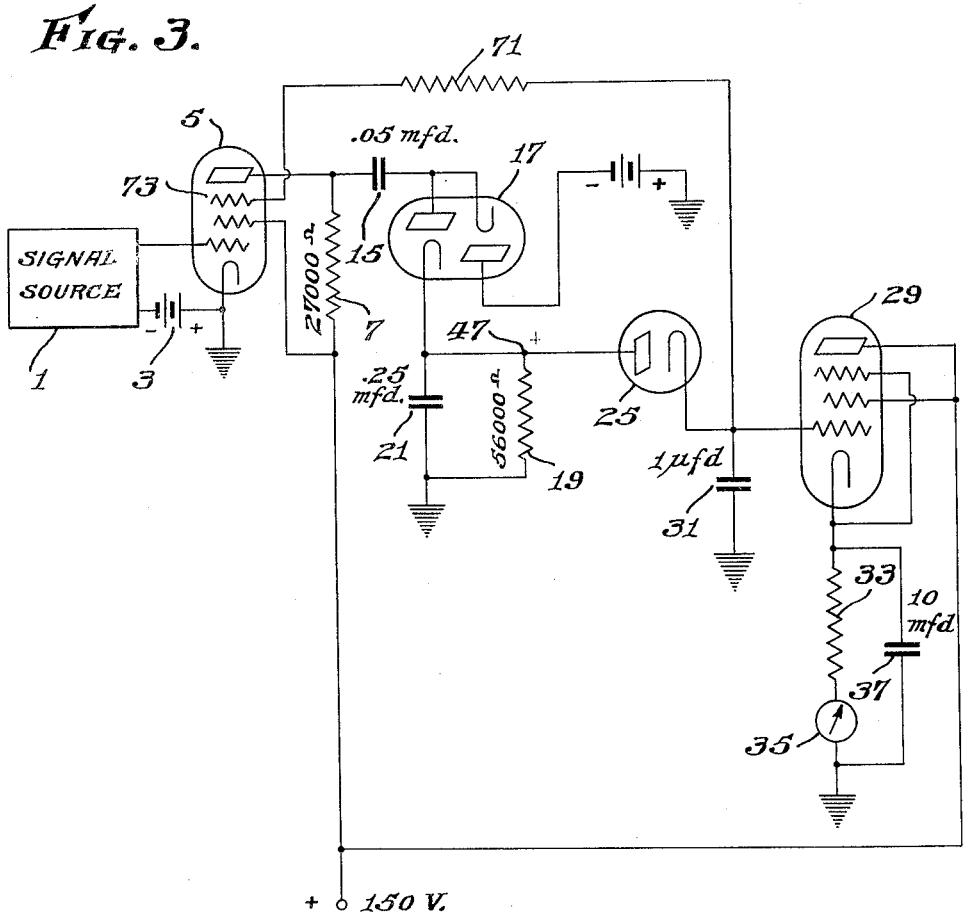

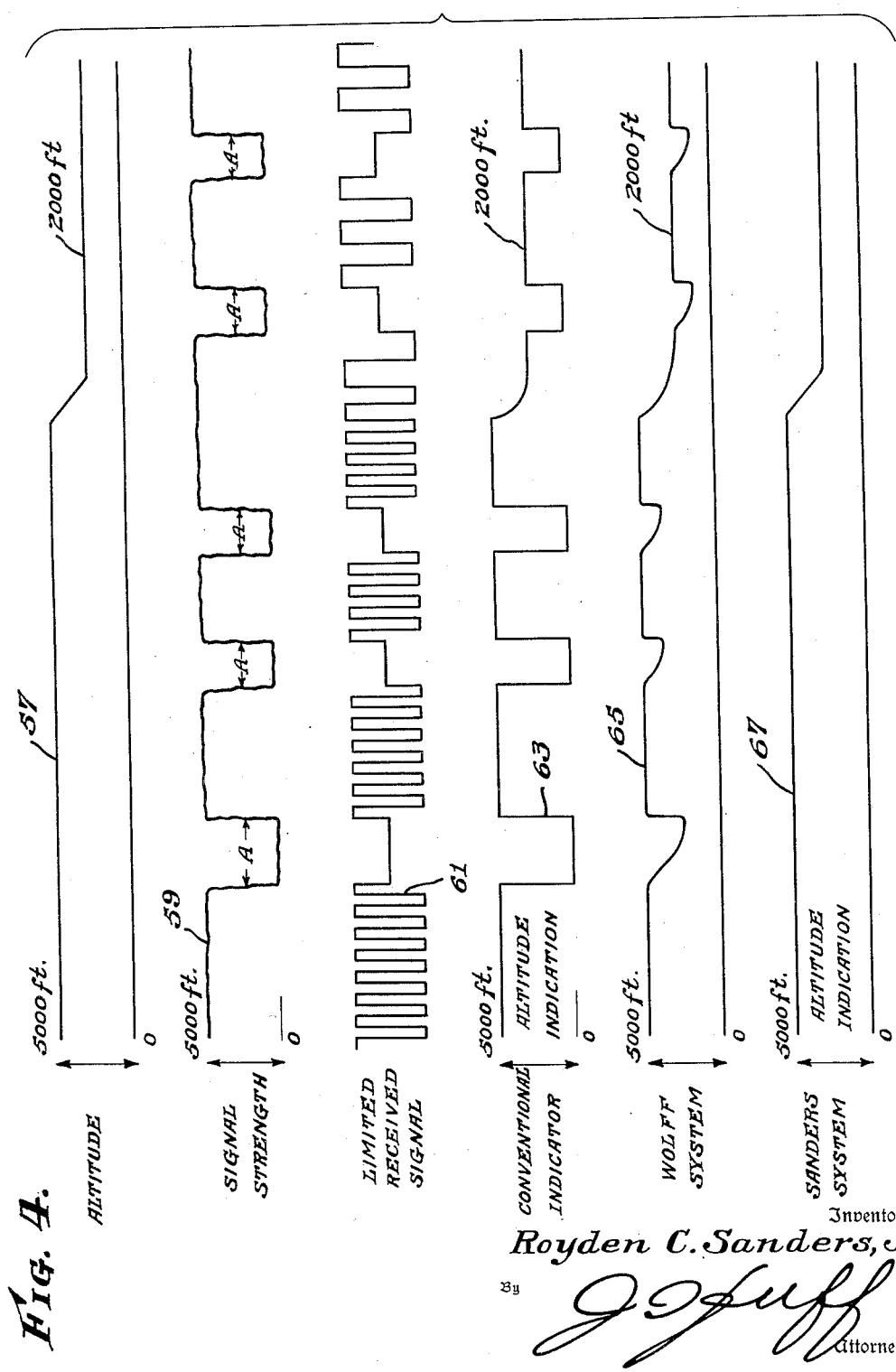

Patented July 9, 1946.

2,403,557

UNITED STATES PATENT OFFICE 2,403,557

FREQUENCY DETERMINING DEVICE

Royden C. Sanders, Jr., Audubon, N. J., assignor to Radio Corporation of America, a corporation of Delaware Application February 27, 1941, Serial No. 380,834

19 Claims. (Cl. 175—368)

This invention relates to frequency determining or counting devices and particularly to devices for determining or counting the frequency of a current subject to amplitude fluctuations.

The frequency of currents has been determined by converting the currents of unknown frequency into a current proportional to the frequency. The converted current, or a voltage corresponding to the current, is then measured to determine the frequency. The frequency may be indicated directly by calibrating the indicator. While this method of measurement, which is known to those skilled in the art as frequency counting, is suitable for indicating the frequency of a current whose amplitude does not substantially vary downwardly, the method is not satisfactory when the amplitude of the current goes below a predetermined amplitude range and especially when the current approaches a very low or zero value.

The difficulty is due to the method of converting the currents of unknown frequency by limiting and rectifying. The limiting will be effective as long as the amplitude of the current exceeds the limiting value. When the amplitude falls below the limiting value, the rectified current is no longer proportional to the frequency and therefore the final indications are in error.

While errors of the foregoing type are not likely to occur in laboratory measurements of the frequency of currents subject to amplitude control, they do occur in frequency measurements of reflected waves and like measurements in which the operator does not have complete control of the amplitude of the currents of unknown frequency. The errors are especially objectionable in radio altimeters, in which loss of signal corresponds to indications of loss of altitude. In a copending application Serial No. 378,713, filed February 13, 1941, now Patent No. 2,307,316, Irving Wolff describes one method of diminishing the errors caused by the fading out of the received signal. The instant invention relates to an improvement in the system proposed by Wolff.

While the Wolff system partially maintains an indication notwithstanding the abnormal downward fading of the signal, the indication does not respond immediately to a lowering of the frequency. That is, if the frequency of the applied current is decreased suddenly, the indicator will respond slowly. Therefore, if used as an altimeter the indicator will temporarily indicate too high an altitude, if the craft carrying the device rapidly loses altitude.

The instant invention has for one of its objects the provision of means for indicating the frequency of a current subject to excessive downward amplitude variations notwithstanding said variations. Another object is to provide means for indicating correctly the frequency of a current notwithstanding variations of amplitude and frequency of the current. Another object is to provide means for indicating faithfully the altitude of an aircraft by means of a frequency modulated radio wave subject to variations in received signal strength. A further object is to provide means for indicating correctly the drift of an aircraft by means of a frequency modulated wave subject to variations in received signal strength. A still further object is to provide improved means for indicating radio echoes of obstacle detecting systems.

Figure 2:
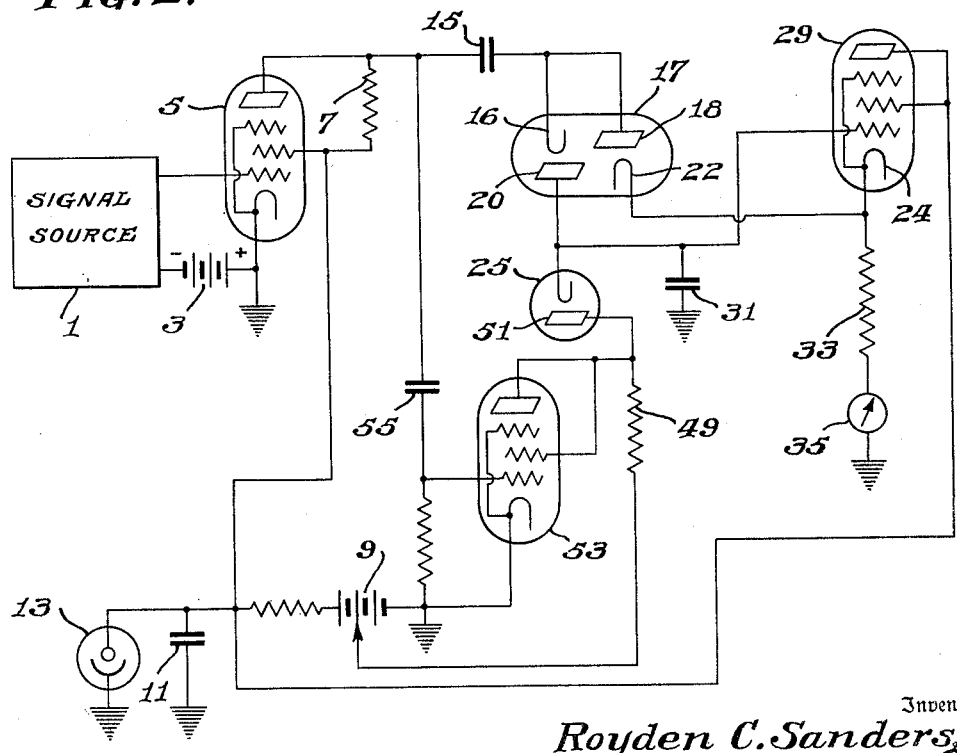

The invention will be described by referring to the accompanying drawings in which Fig. 1 is a circuit diagram of a preferred embodiment of the invention; Figs. 2 and 3 are circuit diagrams of modifications of the invention; and Fig. 4 is a graph illustrating the operation of the indicator as an altimeter. Similar reference characters indicate similar elements in the several figures.

Referring to Fig. 1, a signal source 1 is connected through a biasing battery 3 to the input of a vacuum tube limiter 5. The output circuit includes a resistor 7 which is connected to a constant voltage source 9. A by-pass capacitor 11 and a limiter 13 which may be a tube of the RCA VR-150 or equivalent type, are connected across the constant voltage source. The upper terminal of the resistor 7 is connected through a capacitor 15 to one of the cathodes 16 and to one of the anodes 18, respectively, of a pair of rectifiers 17. The other anode 20 is connected through a resistor 19, which is shunted by a capacitor 21, to a potentiometer 23 shunting the voltage source 9. The anode 20 is also connected through the cathode-anode path of a third or isolating rectifier 25 and a limiting resistor 27 to the grid of a direct current amplifier 29. A capacitor 31 is connected between the anode of the isolating rectifier and ground.

The cathode 24 of the direct current degenerative or negative feedback amplifier is connected to the remaining cathode 22 of the pair of rectifiers 17 and through a resistor 33 and a meter 35 to ground. The resistor 33 may be by-passed by a capacitor 37. The anode and screen electrodes of the direct current amplifier are connected to the positive terminal of the voltage source 9.

A signal controlled discharge path is provided by connecting a second pair of rectifiers 39 as follows: One of the anodes 26 is connected to ground; the other anode 28 and a cathode 30 are connected through a capacitor 41 and a resistor 43 to the upper terminal of the resistor 7. The junction of the resistor 43 and capacitor 41 is connected to ground through a capacitor 45. The remaining cathode 32 of the second pair of rectifiers is connected to the anode of the isolating rectifier 25.

The operation of the device is as follows: Currents of the frequency to be determined are applied to the limiter 5. The bias on the input of the limiter prevents response to currents of less than a predetermined amplitude. The currents exceeding a predetermined amplitude are limited by the action of the anode resistor 7. The thus limited currents alternately charge and discharge through the action of the capacitor 15 and pair of rectifiers 17. The rectified currents charge the network including resistor 19 and capacitor 21, so that the voltage across the network is proportional to the frequency of the applied signal currents. The time constant of the network is made preferably longer than the lowest frequency to be measured.

The charge on the capacitor 21 is of such polarity that the terminal 47 will be negative with respect to point 48. The potentiometer 23, connected to point 48, provides an initial positive bias. The negative potential being applied to the cathode of the isolating rectifier 25 will cause current to flow through that rectifier to charge the capacitor 31 to approximately the same potential as point 47. The charging of the capacitor 31 establishes a potential on the grid of the direct current degenerative feedback amplifier 29. Because of a large degenerative feedback, the output voltage developed from cathode 24 to ground is only slightly greater than the voltage applied between grid and ground. This output voltage is indicated by the meter 35 in the cathode lead. The meter may be calibrated to indicate frequency, altitude, or drift according to its use.

It will be observed that the second pair of rectifiers 39 are connected across the capacitor 31. In the presence of applied signals, the second counter circuit which includes the rectifiers 39 provides a constant current for the capacitor 31. This current is opposite in polarity to the main charging current applied to the capacitor 31. Since it is preferable that the current from the rectifiers 39 be constant with respect to frequency and amplitude, it is necessary to employ the network 43, 45. This network has an attenuation characteristic increasing with frequency, while the series capacitor 41 and rectifier 39 develops a voltage which is proportional to the frequency and the applied voltage. The resulting combination has a characteristic which is independent of both the frequency and amplitude of the signals applied to the limiting amplifier 5.

In the absence of signal, no current will flow through the second pair of rectifiers 39 and therefore the capacitor 31, now isolated by the rectifier 25, will have no discharge path except the infinitely high resistance input path of the direct current amplifier. Thus the time constant of the circuit including diode 25 has been increased to infinity. Leakage resistance of capacitor 31 and other circuit leakages prevent the time constant of the discharge circuit for capacitor 31 from actually being infinity. Under these conditions the meter 35 will continue to indicate the frequency of the signal currents last charging the capacitor 31. In the event that the signal is again applied no change will be noted if the frequency is unaltered. If the frequency has decreased, the charge on capacitor 31 will be reduced quickly; if the frequency has increased, the charge on capacitor 31 will be increased. Thus the indicator will continue to indicate correctly the frequency of the last applied current and will respond substantially immediately, to indicate any change in frequency. Furthermore, the indicator will be substantially independent of the amplitude fluctuations of the signal, and will continue to indicate correctly even when the signal falls to zero for intervals of a fraction of a minute or such time as may be desired.

The cathode connection of one section of the first pair of rectifiers to the cathode of the direct current amplifier 29 is used to bias the cathode 22 of the rectifier 17 somewhat positive with respect to the rectifier anode to overcome the contact potential or lack of linearity in the rectifier. Since the rectifier 25 and the grid-cathode 24 of the amplifier 29 have voltages developed by their contact potentials, it is desirable to minimize the effect of these potentials on the meter 35 by applying frequency meter voltages which are many times greater than the undesired contact potentials.

The method of indicating frequency, in which the signal controlled discharge path is used to eliminate the undesired effects of signal amplitude fluctuation, may be practiced by a number of different circuits. By way of example, another type of circuit is shown in Fig. 2. The signal limiter tube 5, the first pair of rectifiers 17, the direct current amplifier 29, meter 35, and power source 9 correspond to similar elements in Fig. 1.

The isolating rectifier 25 and a resistor 49 are shunted across the capacitor 31 in which the charge is proportional to the frequency of the signal currents. The discharge path includes the isolating rectifier 25 and a resistor 49 which connects the anode 51 of the rectifier to a source of positive bias. The output circuit of a pentode 53 is connected across the resistor 49. The input circuit of the pentode is connected through a capacitor 55 to the upper terminal of the resistor 7 to provide a connection to the signal source.

There are two modes of operation of the circuit of Fig. 2; one, the normal, and, two, the abnormal. In the normal mode in the presence of applied signals, the anode circuit resistance of the pentode 53 alternately rises to infinity and falls to a finite value. When the anode circuit resistance is infinitely great, the shunt path across the capacitor 31 becomes that of the conducting path of the rectifier 25 and the series resistance 49. This operation is obtained because the voltage drop through the resistor 49 is substantially zero when the grid of the pentode 53 is negative and therefore the anode 51 will be positive and hence the rectifier 25 resistance will be finite. When the grid is positive the voltage drop in the resistor becomes so great that the anode 51 will be negative and hence the rectifier resistance will be high. When the anode circuit resistance is finite, the resistance of the shunt path becomes infinite. To assure the finite and infinite condition, the cathode of the isolating rectifier 25 should never become less than five or ten volts positive with respect to the cathode of the pentode 53. These changes in shunt path resistance are caused by the application of more or less anode current of the rectifier 25 which is fed through the pentode anode circuit resistor 49. Thus, during normal operation, the shunt path is only effective half the time. During abnormal operation, that is, when the signal approaches zero, the shunt path resistance becomes infinitely great and the capacitor 31 is isolated. This operating condition is determined by the initial or steady bias applied to the input of the pentode. This bias is chosen so that the maximum current flows in the anode circuit of the pentode in the absence of signal. Furthermore, for the most accurate results, if an amplifier precedes the limiting amplifier, the preceding amplifier should be linear.

While the circuits of Figs. 1 and 2 are especially suited for use in an altimeter of the type disclosed in the copending application Serial No. 293,128, filed September 1, 1939, by Irving Wolff and Royden C. Sanders, Jr., for Frequency modulated radio altimeters, the circuit of Fig. 3 is better adapted to the altimeter system disclosed in the Bentley Patent No. 2,011,392. The altimeter described in the Wolff and Sanders application employs a modulation band which decreases as the altitude increases; the altimeter disclosed in the Bentley patent uses a modulation band which is of a constant value; that is, the band is varied as a function of altitude. This difference has the following effect on the indicator circuit design. In the case of variable band, the derived voltage should become increasingly negative as the frequency increases to simplify the circuit controlling the band variation. In the constant band system, the derived frequency meter voltage may be increasing positive with increasing frequency and, therefore, the design of the frequency indicating meter may be simplified as shown in Fig. 3.

Referring to Fig. 3, the signal source 1 is connected to the input of the limiting amplifier 5 which is biased to cut-off by a bias battery 3. The output of the amplifier includes a resistor 7 which is connected through a capacitor 15 to the diodes 17. The diodes 17 are connected to a network including a capacitor 21 shunted by a resistor 19. The upper terminals of this network are connected through an isolating diode 25 to the input grid of the degenerative amplifier 29. The grid is also connected to the capacitor 31. The cathode circuit of the degenerative amplifier 29 includes a self-bias resistor 33, the indicating meter 35, and a bypass capacitor 37. The discharge path, which is controlled by signal current, is obtained by connecting the cathode of the isolating diode through a resistor 71 to the suppressor grid 73 of the limiting amplifier 5. The majority of the elements of the instant circuit correspond to similarly identified elements in the preceding circuits.

The operation of the circuit of Fig. 3 is not greatly different from that of the circuit of Fig. 1. The essential differences are as follows: First, there is no steady positive bias voltage in series with the frequency meter voltage derived from the signal currents in the diodes 17 of the instant circuit. Second, in the instant circuit, the frequency meter voltage becomes increasingly positive as the applied frequency increases. Third, the signal controlled discharge path for the capacitor 31 includes the resistor 71 and the grid 73 of the limiting amplifier 5. The grid 73 acts as an anode to provide a constant discharge path which is effective only in the presence of an applied input signal. The series resistor 71 makes the path one of substantially constant resistance during the presence of an applied signal.

One of the uses of the frequency counter of the instant invention is in altimeters or drift indicators where variations in signal strength would produce erroneous indications. The operation of an altimeter of the frequency indicating type is illustrated in Fig. 4. The upper or first curve 57 indicates the actual altitude. The second curve 59 immediately below the altitude curve indicates the corresponding reflected signal strength. The third curve 61 shows the limited received signal. The fourth curve 63 illustrates the indicated altitude on a conventional frequency counter device. The fifth curve 65 shows the improved indications obtained in accordance with the above-mentioned Wolff application and the last curve 67 illustrates the indications obtained in accordance with the instant invention. The intervals A on the second curve indicate periods of low signal strength or absence of signal due to fading or discontinuity in the reflecting or transmitting media.

I claim as my invention:

1. A frequency determining device including means for deriving from the current whose frequency is to be determined a current proportional to said frequency, means for applying said proportional current to a capacitor circuit including a meter, said circuit having a predetermined time constant, and means for changing said time constant in response to a change in the amplitude of said current whose frequency is to be determined to minimize the effect of an amplitude change on the reading of said meter.

2. A frequency determining device including means for deriving from the current whose frequency is to be determined a current proportional to said frequency, means for applying said derived current to a circuit including a meter and having a time constant longer than the period of the lowest frequency to be measured, and means connected to said circuit for varying said time constant inversely as the amplitude of the current whose frequency is to be determined to minimize the effect of an amplitude change on the reading of said meter.

3. A frequency determining system including a source of currents of unknown frequency, means for deriving from said source currents proportional to the frequency, a circuit including a meter and having a predetermined time constant, means for applying said derived currents to said circuit, and means effectively connecting said source and said circuit for increasing said time constant in response to a decrease in the amplitude of the currents in said source.

4. A frequency determining device including in combination means for deriving from the signal current whose frequency is to be determined a current proportional to said frequency, means for applying said derived current to a circuit including a meter for indicating said frequency for applied currents of unvarying amplitude, means for isolating said circuit whereby the isolating means prevents said meter from responding to downward amplitude fluctuations in signal current, and means connecting said isolating means and said current deriving means for making said meter respond quickly to variations in the frequency of the applied signal current.

5. A frequency determining device including in combination a source of currents of unknown frequency, means for deriving from said source currents proportional to the unknown frequency, a network including a meter and having a predetermined time constant, means including an isolating rectifier for applying said derived currents to said network, and a pair of rectifiers effectively connected to said source and to said network for changing said time constant in response to a change in the amplitude of the source currents.

6. A frequency determining device including in combination a source of currents of unknown frequency, means for deriving from said source currents proportional to the unknown frequency, a network including a meter and having a predetermined time constant, means for applying said derived currents to said network, and a thermionic tube effectively connected to said source and to said network for increasing said time constant as the amplitude of said source currents decreases below a predetermined value.

7. A device of the character of claim 5 including means for minimizing any undesired frequency response characteristics of the connection between the source and said network.

8. A device of the character of claim 1 including means for making said meter response a linear function of the frequency of the applied currents.

9. The method of indicating the frequency of an applied current which includes limiting the amplitude of said current, applying the limited current to charge a capacitor to a voltage which is proportional to the frequency, applying said voltage to charge a second capacitor, indicating the frequency of the applied current as a function of the voltage of said second capacitor, and changing the time constant of the circuit including said second capacitor in response to a change in the amplitude of said applied current.

10. The method of indicating the frequency of an applied current which includes limiting the amplitude of said current, applying said limited current to charge a capacitor to a voltage proportional to frequency, indicating the frequency of said applied current as a function of the voltage of said capacitor, and varying the rate of discharge of said capacitor as a function of the amplitude of said applied current.

11. The method of indicating the frequency of a signal current which includes limiting the amplitude of said signal current, rectifying said limited current, charging a capacitor as a function of said rectified current, measuring the voltage of said capacitor to indicate said frequency, and decreasing the discharge rate of said capacitor in response to a decrease in the amplitude of said signal current.

12. The method of indicating the frequency of a signal current which includes limiting the amplitude of said signal current, rectifying said limited current, charging a capacitor as a function of said rectified current, measuring the voltage of said capacitor to indicate said frequency, varying the discharge rate of said capacitor as a function of the amplitude of said signal current, and eliminating undesired variations caused by varying said discharge rate.

13. The method of indicating the frequency of a signal current which includes limiting the minimum and maximum amplitude of said signal current, rectifying said limited current, charging a capacitor as a function of said rectified current to a voltage proportional to the frequency, measuring the voltage of said capacitor to indicate said frequency, and decreasing the discharge rate of said capacitor in response to a decrease in the amplitude of said signal current.

14. The method of indicating the frequency of an applied current which includes limiting the amplitude of said current, applying said limited current to charge a capacitor to a voltage proportional to frequency, indicating the frequency of said applied current as a function of the voltage of said capacitor, and making the discharge rate of said capacitor very slow during intervals corresponding to the application of currents of less than limitable amplitude.

15. A frequency determining circuit comprising a frequency counter circuit which includes a storage capacitor and means for charging said capacitor in accordance with a function of the applied frequency, a discharging circuit for said capacitor, and means for substantially increasing the impedance of said discharging circuit in response to a decrease below a predetermined limit in the amplitude of the signal whose frequency is being measured.

16. A frequency determining circuit comprising a frequency counter circuit which includes a storage capacitor and means for charging said capacitor in accordance with a function of the applied frequency, a discharging circuit for said capacitor, and means for opening said discharging circuit in response to a decrease below a predetermined limit in the amplitude of the signal whose frequency is being measured.

17. A frequency determining circuit comprising a frequency counter circuit which includes a storage capacitor and means for charging said capacitor in one direction, an isolating rectifier, and a second frequency counter circuit connected through said rectifier to said capacitor for charging it in the opposite direction.

18. A frequency determining device comprising a frequency counter which includes a storage capacitor, a rectifier in series therewith connected to conduct in one direction and a rectifier connected across said series combination in the direction to conduct in the opposite direction, a second frequency counter which includes a storage capacitor, a rectifier connected in series therewith to conduct in a direction opposite to said one direction and a rectifier connected across said last series combination in the direction to have conduction in a direction opposite to the conduction of the last rectifier, a leak resistor connected across the capacitor of said second frequency counter, and an isolating rectifier connected between the junction point of the rectifier and capacitor of the first series combination and the junction of the rectifier and capacitor of the second series combination, said last rectifier being connected in the direction to conduct current in the same direction through the first storage capacitor as the rectifier of the second series combination.

19. The invention according to claim 18 wherein the capacitor of the second series combination has its terminal that is remote from the junction point connected to a point of positive direct current potential.

ROYDEN C. SANDERS, Jr.